United States Patent Office 3,248,337
Patented Apr. 26, 1966

3,248,337
COMPOSITE REDUCING AGENT FOR USE IN THE TEXTILE INDUSTRY
Guenter Zirker, Gerhard Schulze, and Adolf Blum, Ludwigshafen (Rhine), Germany, assignors to Badische Anilin- & Soda-Fabrik Aktiengesellschaft, Ludwigshafen (Rhine), Germany
No Drawing. Filed Apr. 3, 1963, Ser. No. 270,149
Claims priority, application Germany, Apr. 7, 1962, B 66,717
1 Claim. (Cl. 252—188)

This invention relates to new mixtures, print pastes, printing compositions and treatment liquors, all having a reducing action, which contain:

(a) As reducing agents, one or more derivatives of alkanesulfinic acids containing preferably one to four carbon atoms and
(b) As redox catalysts, chelate complexes of transition metals, preferably of iron, nickel and cobalt.

In the dyeing and/or printing of textile materials with vat dyes and/or sulfur dyes, sodium dithionite or derivatives of alkanesulfinic acids are as a rule used as the reducing agent in an alkaline medium.

In the literature, for example in British patent specification No. 829,936 or in U.S. patent specification No. 2,993,743, the alkali metal, alkaline earth metal, dizinc or ammonium salts of linear or branched hydroxyalkanesulfinic acids having one to four carbon atoms are specified as reducing agents and in British patent specification No. 881,487 and U.S. patent specification No. 2,993,742, compounds of the general formula:

are specified as reducing agents, A denoting a hydrogen atom or a low molecular weight alkyl radical which in turn may bear as substituent a radical of the general formula:

D in Formulae I and II denoting the radical of a salt of an alkanesulfinic acid having one to four carbon atoms and having the general formula:

In Formula I, $x$ may be one of the numbers 0, 1 and 2 and $y$ may be one of the numbers 1, 2 and 3 and $(x+y)$ is equal to 3. In Formula II, $p$ may be 0, 1 or 2 and $q$ may be 0, 1 or 2 and $(p+q)$ is always equal to 2. In Formula III, each of the radicals E and G may denote a hydrogen atom or an alkyl radical and $Z^\oplus$ denotes the cationic radical of an alkali metal or alkaline earth metal or of ammonium.

It is also known from the literature, for example from German patent specification No. 1,004,188, to use formamidinesulfinic acid (also known as aminoiminomethanesulfinic acid or thiourea dioxide) in an alkaline medium instead of sodium dithionite or sodium hydroxymethanesulfinate as reducing agent.

The abovementioned reducing agents, particularly the water-soluble reducing agents, differ from each other in that they have different stabilities at temperatures between about 10° and 35° C. (i.e. they have different redox potentials). They may be used for dyeing and/or printing textile material, such as fibers, filaments, threads, flock, woven fabrics and knitted fabrics, preferably of native and/or regenerated cellulose, but also of natural silk or synthetic linear polyamides. Moreover the said reducing agents may be used for dyeing and/or printing union fabrics or mixed spun goods, for example of natural and synthetic fibers, such as cotton and linear aromatic polyesters, for example polyethylene glycol terephthalate, or based on terephthalic acid and p-dimethylolcyclohexane. When the said reducing agents have poor solubility in water, they may also be used for printing and/or discharging textile materials.

Sodium dithionite is generally preferred as the reducing agent in dyeing, whereas the other compounds of the abovementioned type are preferably used as reducing agents in printing. The use of reducing agents in dyeing, apart from so-called pigment padding methods, takes place in aqueous alkaline medium as a rule. In so-called direct printing methods, the reducing agent is added together with an alkaline reacting agent to a print paste containing a thickening agent and the dye, and in the so-called two-phase printing method, the material is printed in a first stage with a print paste containing the dye and then treated with the reducing agent in a second stage.

Since different requirements are placed on the reducing agent to be used in the different dyeing or printing processes, and none of the prior art reducing agents fulfills all the requirements, it is usual to select sodium dithionite or derivatives of alkanesulfinic acids of the abovementioned type as reducing agent in alkaline medium, depending on the purpose. In this state of the prior art, reducing agents are sought which in alkaline medium will combine the advantages of the various conventional reducing agents without the disadvantages attendant on the use of these reducing agents. To be widely useful, therefore, reducing agents should be stable in the temperature range between 10° and 35° C. (i.e. they should be distinguished within this range by the lowest possible redox potential), but should be capable at temperatures of around 100° C. (i.e. at temperatures between about 90° and 110° C.) of reducing vat dyes and/or sulfur dyes in the shortest possible time (i.e. they should have the highest possible redox potential at these temperatures). Cobalt and its oxides and salts have already been added to vat dye liquors to avoid change of shade which some vat dyes undergo when heated. For the same purpose, an addition of water-soluble nickel salts, ferrocyanides and ferricyanides has also already been recommended. Furthermore it is known that copper ions catalyse the oxidation of sodium hydroxymethanesulfinate. It has also been proposed to use anthraquinone as a catalyst in discharge pastes which contain sodium hydroxymethanesulfinate or sodium dithionite as reducing agent. The requirements mentioned above cannot however be fulfilled with these additions. Moreover anthraquinone has the unpleasant property of undesirably changing the shade of color of some vat dyes.

We have now found that reducing mixtures which contain:

(a) One or more derivatives of alkane sulfinic acids preferably containing one to four carbon atoms as reducing agent and, as redox catalyst,
(b) At least one chelate compound of a transition metal having a plurality of valency stages of which the lowest is not the most stable in the complex, the concentration of free ions of the transition metal in the mixtures containing the complex, and in the print pastes, printing compositions and treatment liquors prepared therefrom being so small that the solubility product of the corresponding metal hydroxides and sulfides is not achieved, may be used in alkaline medium as reducing agents with particular advantage.

The compounds specified under (a) may also be termed aliphatic sulfine compounds.

Examples of derivatives of alkanesulfinic acids preferably having one to four carbon atoms are particularly the alkali metal, alkaline earth metal or ammonium salts of linear or branched hydroxyalkanesulfinic acids having one to four carbon atoms and having the general formula:

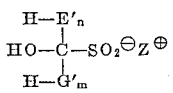

in which E' and G' denote alkylene radicals, $n$ and $m$ each denote one of the numbers 0 and 1 and $Z^\oplus$ denotes a cationic equivalent, preferably of ammonium, sodium, potassium, magnesium, calcium or barium, and also advantageously compounds having the general Formula I:

 (I)

in which A, D, $x$ and $y$ and $(x+y)$ have the meanings given above, and also formamidinesulfinic acid. The alkali metals and alkaline earth metals from which the cations of the said salts may be derived are, for technical reasons, the metals which have the atomic numbers 11, 12, 19, 20 and 56 in the Periodic System of the elements. The low molecular weight alkyl group A is preferably a group containing one to four carbon atoms, but groups having a larger number of carbon atoms may also be used. The same is true of the groups E and G.

The said reducing agents may be represented by the following general formula:

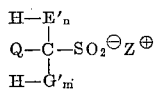

In this formula, Q denotes a hydroxyl group or a group having the general formula:

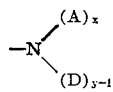

A denotes a hydrogen atom or a low molecular weight alkyl group, preferably one having one to four carbon atoms, which may be substituted by a group having the general formula:

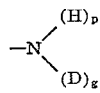

D denotes a group having the general formula:

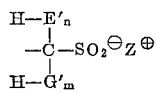

$x$ denotes one of the numbers 0, 1 and 2;
$y$ denotes one of the numbers 1, 2 and 3;
$(x+y)$ denotes the number 3;
$p$ denotes one of the numbers 0, 1 and 2;
$g$ denotes one of the numbers 0, 1 and 2;
$(p+g)$ denotes the number 2;
E' denotes an alkylene radical; G' denotes an alkylene radical, E' and G' together containing not more than three carbon atoms; $n$ denotes one of the numbers 0 and 1;
$m$ denotes one of the numbers 0 and 1 and $Z^\oplus$ denotes a cationic equivalent, preferably of ammonium, sodium, potassium, magnesium, calcium or barium.

Examples of alkali metal, alkaline earth metal or ammonium salts of linear or branched hydroxyalkanesulfinic acids are the sodium, potassium, calcium, barium or ammonium salts of hydroxymethanesulfinic acid, 1-hydroxyethanesulfinic acid-(1), 1-hydroxypropanesulfinic acid-(1), 2-hydroxypropanesulfinic acid-(2) and 1-hydroxy-n-butanesulfinic acid-(1).

Compounds having the general Formula I:

 (I)

in which A, D, $x$, $y$ and $(x+y)$ have the meanings given above, are obtained in various ways, for example by allowing alkali metal salts, such as the sodium or potassium salt, or alkaline earth metal salts, such as the calcium or barium salt, or ammonium salts of linear or branched hydroxyalkanesulfinic acids having one to four carbon atoms and which bear the hydroxyl group and the sulfinic acid group on the same carbon atom, such as hydroxymethanesulfinic acid, 1-hydroxyethanesulfinic acid-(1), 1 - hydroxypropanesulfinic acid-(1), 2 - hydroxypropanesulfinic acid-(2) or 1-hydroxy-n-butanesulfinic acid-(1), to act on ammonia or on derivatives of ammonia which bear at least one hydrogen atom attached to nitrogen. Salts of different hydroxyalkanesulfinic acids having one to four carbon atoms may also be allowed to act simultaneously or successively in any sequence on ammonia or on the abovementioned derivatives of ammonia.

The chelate complexes contained as redox catalyst in the new mixtures are for the most part known. They contain as central atom the atom of a transition metal capable of occurring in more than one valency stage and of which the lowest stage in the complex is not the most stable. Following popular usage, the term "transition metal" includes the elements having the atomic numbers 21 to 30, 39 to 48, 57 to 80 and 89 to 102 in the Periodic System of the elements. The transition metals which satisfy the abovementioned condition are in Groups I, IV, V, VI, VII and VIII of the Periodic System of the elements. ("Handbook of Chemistry and Physics," 40th edition, pages 448 and 449, Chemical Rubber Publishing Co., Cleveland.) Elements having the atomic numbers 22 to 29 are of particular technical importance for the purposes of the invention. Chelate complexes of the metals iron, cobalt, nickel and copper are preferred. The chelate complexes of metals having the atomic numbers 26 to 28 (i.e. iron, cobalt and nickel) are in general more effective than that of copper and are therefore used in preference to the copper complexes.

The term "chelate" or "chelate complex" has the generally accepted meaning in the present specification. As the term "chelate complex" itself indicates, a special group of complex compounds is here involved. A complex compound is understood to be a substance which is formed when a metal ion combines with an electron donor, i.e. with a substance having free electron pairs. The free electron pairs of the donor serve to supplement the electrons of the metal ion so that the entire electron system approximates as closely as possible to that of the particularly stable rare gas configurations. In the complex thus formed, the metal ion is termed the "central" atom, while the donor molecules attached thereto are termed "complex formers" or "ligands." The number of ligands in complex combination to the central atom is called the coordination number of the central atom. It is usually 6, sometimes 4 and only occasionally 2 or 8.

It is characteristic of chelate complexes that their ligands are combined with a plurality of atoms to the central atom. They are formed from metal ions and so-called chelating agents, i.e. organic molecules having a plurality of groups, usually two to four groups, functioning as electron donors. The words bidentate, tridentate, quadridentate and so on have been coined to describe chelating agents depending on the number of donor groups present therein. Complex-forming substances having one donor group capable of forming only simple complexes and not chelates are analogously termed unidentate. The consequence of polydentation is that the central atom is combined more than once with a chelating agent and thus forms therewith at least one ring. The maximum number of chelate-forming ligands combined to a given central atom results as the quotient from the coordination number of the central atom and the number of donor groups contained in the ligands. Thus a metal ion having the coordination number 6 is capable for example of entering into complex combination with up to three bidentate ligands or up to two tridentate ligands. A chelate complex is present however when only one at least bidentate ligand is combined to the central atom, while the remaining coordination sites are occupied by unidentate ligands.

A good survey of the field of chelate complexes is given in the book "Chemistry of the Metal Chelate Compounds" by Arthur E. Martell and Melvin Calvin (Prentice-Hall, Inc., New York, 1952), particularly on pages 1–18.

The nature of the ligands forming the chelate ring affects the stability of the chelate complexes formed therewith. For the present invention, those complexes are required whose complex linkages are not released by secondary reactions during storage and use of the new mixtures, print pastes, printing compositions and treatment liquors. The new mixtures, print pastes, printing compositions and treatment baths usually contain, besides reducing agents and chelate complexes, alkaline reacting substances; the reducing agent may moreover form sulfide ions. The chelate complexes must therefore be of sufficient stability not to be destroyed with the deposition of hydroxides and sulfides corresponding to the central atom in the presence of hydroxyl ions and sulfide ions. The complex-forming constant K is a measure of the stability of chelate complexes. This gives the position of the equilibrium between chelate formation and chelate decomposition. The equilibrium reaction may be represented by the following general equation:

$$M + xKe \rightleftharpoons MKe_x \qquad (I)$$

in which M denotes the metal ion entering into the complex as central atom, $Ke$ denotes the ligand and $x$ is the number of ligand molecules combined to the central atom. According to the law of mass action, the equilibrium constant of the above reaction (i.e. the complex-formation constant)

$$K = \frac{(MKe_x)}{(M)(Ke)^x} \qquad (II)$$

The brackets denote the activities or approximately the concentrations of the bracketed substances. The greater the complex-formation constant K, the smaller the concentration of non-complex-forming metal ions (M) when reaction (I) is in equilibrium, as may be seen from Equation II.

For the purposes of the present invention, chelate complexes are suitable whose complex-formation constant is so high that the concentration of metal ions present in chemical equilibrium with the complexes is insufficient to give with the hydroxyl ions and sulfide ions which are also present, precipitates of the corresponding metal hydroxides or metal sulfides. It is known that these conditions are fulfilled when the so-called solubility product of the metal hydroxides or metal sulfides has not been reached. The solubility product is defined as the product of those concentrations of anions and cations at which these ions begin to precipitate each other. An exhaustive explanation of the term solubility product and numerical values for the solubility products of the more important difficultly soluble salts is to be found in "Handbook of Chemistry and Physics," 40th edition, pages 1740 and 1741, Chemical Rubber Publishing Co., Cleveland.

From the above statements it results that in principle the utility of a chelate complex for the present invention may be calculated from the complex-formation constant on the one hand and the solubility product of the hydroxides and sulfides corresponding to the central atom on the other hand. In practice, however, it is much simpler to determine utility by a simple preliminary experiment. Those chelate complexes may be used which are not destroyed by an aqueous solution containing 5 moles per liter of hydroxyl ions and 0.01 mole per liter of sulfide ions with the formation of insoluble metal hydroxides and metal sulfides. For the sake of simplicity, such chelate complexes are hereinafter referred to as stable complexes. Chelate complexes whose aqueous solutions contain more than $10^{-6}$ gram atoms per liter of free ions of the transition metals are not suitable for the present invention. Compounds which are capable of forming chelate complexes with ions of the transition metals must contain at least two atom groups which act as electron donors with respect to the transition metal ions. In the book of Martell and Calvin already referred to, the important chelate donor groups are dealt with in the section 4.6 on pages 167 to 171 and collected in the Table 4.7 on page 168. In addition to the groups there specified, the azo group —N=N— is also suitable as a donor group for the purposes of the present invention. Stable chelate complexes in the sense of the above statements are particularly those complex-forming substances which bear at least one donor group containing a nitrogen atom (the most important nitrogenous donor groups for the invention are the primary, secondary and tertiary amino groups, the imino group, the oxime group and the azo group) and whose donor atoms are separated from each other by two or three atoms; these form five-membered or six-membered rings with the central atom. Chelates formed from such chelating agents therefore have a special significance for the present invention.

The following are examples of such chelating agents: monooximes, dioximes and monoarylhydrazone-monoximes of 1,2- and 1,3-diketones, 1,2- and 1,3-ketone aldehydes and 1,2- and 1,3-dialdehydes, such as 1,2-naphthoquinone-1-oxime, monomethylglyoxime, dimethylglyoxime, methylethylglyoxime, benzildioxime and p-nitrophenylhydrazone of diacetylmonooxime, oximes of 1,2- and 1,3-hydroxy aldehydes and 1,2- and 1,3-hydroxyketones, such as salicylaldoxime and benzoinoxime, dicyanodiamidine, 1,2- and 1,3-diamines, such as ethylene diamine, 1,2-propylenediamine and their Schiff bases with 1,3-dicarbonyl and 1,3-carbonylhydroxyl compounds, such as di-(2-hydroxybenzylidene)-ethylene diamine and di-acetylacetonylidene-ethylene diamine, pyridine and pyrrole derivatives containing at least two ring nitrogen atoms separated by two or three atoms, such as $\alpha,\alpha'$-dipyridyl, o-phenanthroline, 2,2'-diquinolyl, porphyrins, phthalocyanine and its derivatives, and also 8-hydroxyquinoline and its derivatives, such as 8-hydroxyquinoline-7-iodo-5-sulfonic acid and alizarin blue, $\alpha$-nitroso-$\beta$-naphthol and rubeanic acid (dithiooxamide), and diphenylthiocarbazone, 1,2-dihydroxybenzene-3,5-disulfonic acid is an example of a chelating agent free from nitrogen. Another group of chelating agents are the known metallizable azo dyes. Chelate complexes of these dyes are for example compounds having the following atomic groupings

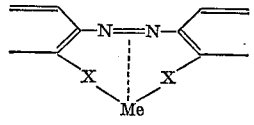

or

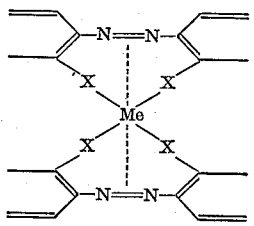

in which X denotes O, S, NH, COO and Me denotes the abovementioned transition metals.

From among these chelating agents we prefer those which are either of themselves quadridentate or which while only bidentate, unite by hydrogen bridges in the final chelate and in this respect are closely similar to the quadridentate chelating agents, as is the case with the chelates of the 1,2-dioximes:

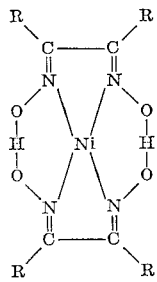

(See page 332, formula CXVI in the abovementioned book by Martell and Calvin.)

The utility of a chelate complex depends mainly on two factors, namely the kind of central atom and the kind of atoms participating directly in the chelate rings. These factors mainly determine the stability of the chelates. On the other hand the other atoms and atomic groups contained in the chelating agents play only a very minor role. The suitable chelates may therefore exhibit extremely great differences in their formulae and this makes it impossible to define them in a simple way by a general chemical formula. The chelating agents may thus contain any substituents which do not take part directly in forming a ring; the only essential condition is that the chelates prepared therefrom contain the abovementioned central atoms and are stable in the sense of the abovementioned definition. The choice of the chelates actually used from among those which are suitable is therefore mainly made on economic grounds.

In this sense the following quadridentate chelating agents and bidentate chelating agents closely related to the quadridentate chelating agents have particular importance for technical reasons: (a) the 1,2-dioximes already referred to above, (b) the Schiff bases of aromatic or aliphatic 1,3-hydroxy-oxo compounds, i.e. 1,3-hydroxyaldehydes or 1,3-hydroxyketones and ethylene diamine or 1,2-propylene diamine, and (c) chelating agents which contain a phthalocyanine or porphyrin skeleton. Chelating agents of the groups (a) and (b) which are particularly readily accessible and therefore preferred may be represented by the following formulae:

(a)
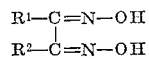

in which the radical $R^1$ denotes a hydrogen atom, an alkyl group having up to two carbon atoms or a phenyl group and the radical $R^2$ denotes an alkyl group having up to two carbon atoms or a phenyl group;

(b)
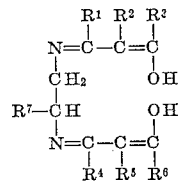

in which $R^1$ and $R^4$ denote hydrogen atoms or low molecular weight alkyl radicals, preferably methyl radicals; $R^2$ and $R^5$ denote hydrogen atoms and $R^3$ and $R^6$ denote methyl groups; the radicals $R^2$ and $R^3$ and also the radicals $R^5$ and $R^6$ may however also form a phenyl ring with each other and with their basic carbon atoms

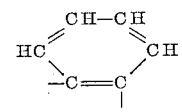

$R^7$ denotes a hydrogen atom or a methyl group. Among the chelating agents of group (c), phthalocyanine, its sulfonic acids and its alkali salts having the formula:

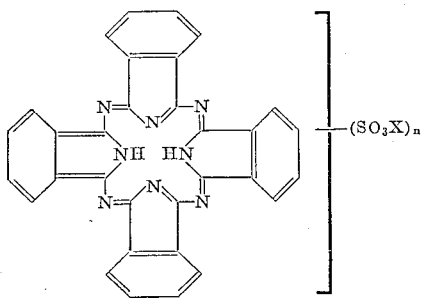

in which X denotes a proton or the cation of an alkali metal, preferably sodium or potassium, and $n$ denotes zero or a whole number, preferably one of the numbers 0, 1, 2, 3 and 4, are preferred because of their ready accessibility.

Naturally occurring chelating agents having porphyrin structure may also be used with the same good results as the phthalocyanines.

In addition to at least one chelate-forming ligand of the said type, the chelate complexes may also contain unidentate ligands which are not capable of forming chelate rings. These unidentate ligands are either neutral substances or anions. Preferred unidentate ligands are water molecules, ammonia molecules and monoamines molecules and halide ions, especially chloride ions, hydroxyl ions and nitrate ions. Cyanide ions should not be contained as ligands in the chelate complexes because they may be readily split off in the form of the extremely toxic hydrocyanic acid.

The entire chelate complex is neutral, anionic or cationic depending on the charges of the central atom and the ligands. In the latter two cases it is present as a salt with cations, such as hydrogen ions, alkali metal ions, alkaline earth metal ions and ammonium ions, or with anions, such as hydroxyl ions, halide ions, sulfate ions and nitrate ions.

The following formulae are given as examples of a few types of chelate complexes; cobalt, nickel or iron in the formulae may be replaced by other of the above defined transition metals and the chelating agents may be replaced by other ligands of this kind.

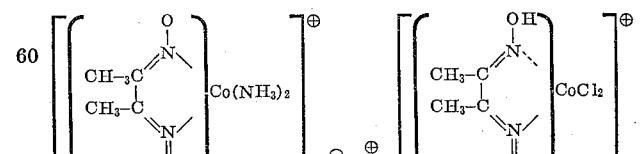

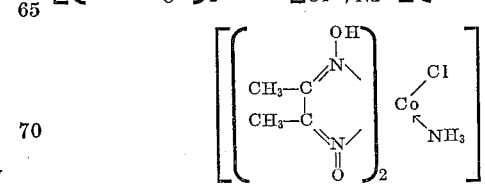

$[(en)_3Co]^{3+} Cl_3$ or $[(en)_3Co]^{2+} (NO_3)_2$
$[(en)_2Co(H_2O)(NH_3)]^{3+} Br_3$

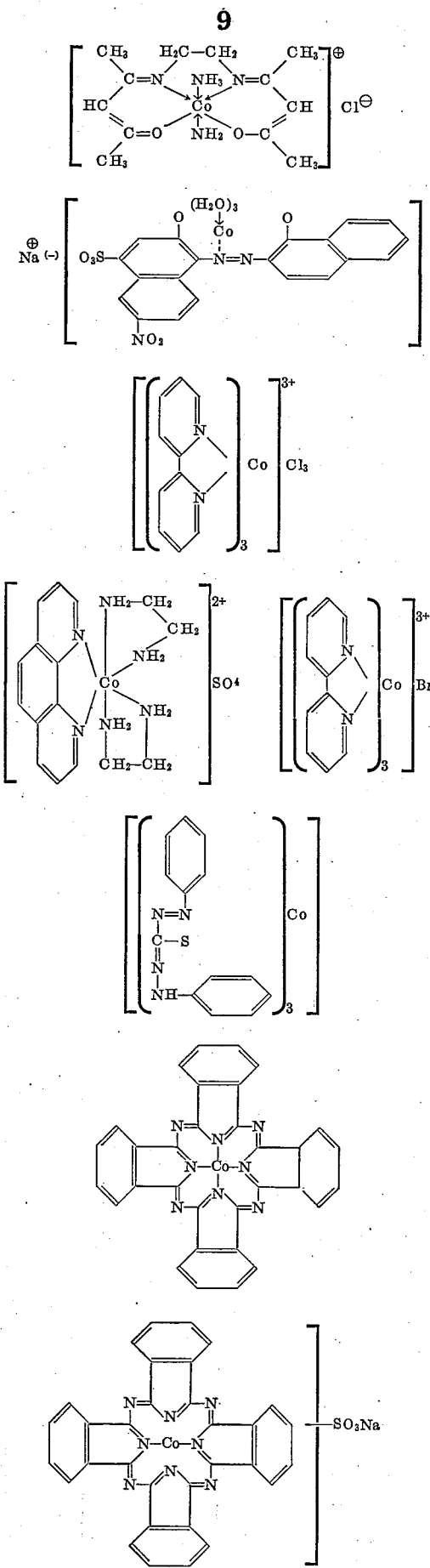
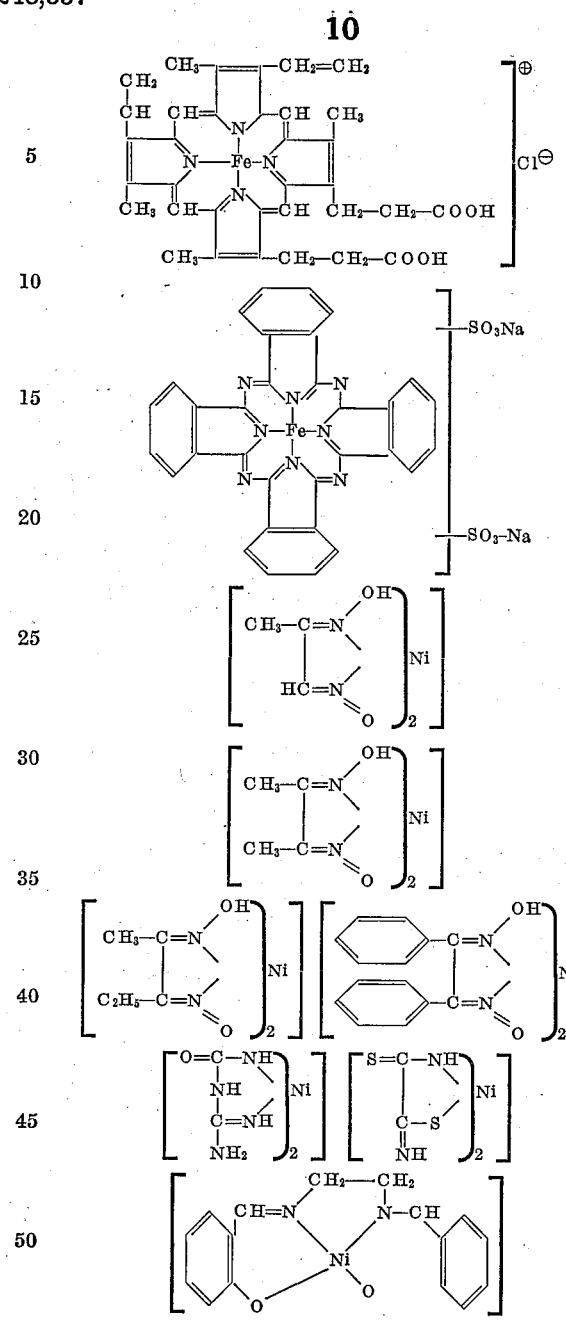

The new reducing mixtures or treatment liquors, for example dyeing liquors and bleaching liquors, may contain the derivatives or alkanesulfinic acids preferably containing one to four carbon atoms and the said chelate complexes as redox catalysts in the proportion of 0.005 to 5%, preferably 0.005 to 1% of the chelate complex (redox catalyst) with reference to the weight of the derivative of an alkanesulfinic acid preferably containing one to four carbon atoms. Chelate complexes which have dye properties, for example the metal complex dyes of azo dyes, should only be present in such small amounts that when the mixtures according to this invention are used they cause no appreciable coloration. The new mixtures may also be prepared on the material to be treated therewith, for example by first printing a textile fabric with a print paste containing the derivative of an alkanesulfinic acid preferably containing one to four carbon atoms and then treating the printed fabric with an aqueous solution containing a redox catalyst, or vice versa. In the preparation of the reducing mixtures according to the invention it is also possible to start from mixtures of two or more derivatives of alkanesulfinic acids containing preferably one to four carbon atoms and/or from mixtures of two or more of the said redox catalysts.

When used as reducing agents for dyeing and/or printing textile materials with vat and/or sulfur dyes, the reducing mixtures according to this invention make a considerable shortening of the reduction period possible (as a rule the reduction rate is doubled in printing when working in the presence of 0.05 to 0.1 g. of a redox catalyst of the abovementioned type per kg. of printing composition and in the presence of the equivalent amount of reducing agent) with a consequent increase in production per unit of time. Moreover when using the new reducing mixtures for the reduction of vat and/or sulfur dyes in alkaline or weakly acid medium, a smaller amount of derivatives of alkanesulfinic acids containing preferably one to four carbon atoms is required then when the sulfinic acid derivatives contained in the reducing mixtures are used alone as reducing agent without adding redox catalysts of the abovementioned type. The chelate complexes used as redox catalysts have only very slight toxicity because they do not contain cyanide ions as ligands. The mixtures according to this invention and the combined use of reducing agent and catalyst therefore fulfill a genuine need in textile dyeing and printing. The mixtures may also be used with advantage for bleaching textiles and other substrates.

The use of the reducing mixtures according to this invention, which may also contain auxiliaries which are desirable or necessary, and the technical advance thereby achieved will be further illustrated by, but are not limited to, the following examples. The parts and percentages specified in the examples are by weight.

*Example 1*

Spun rayon fabric is printed with the following print paste:

300 parts of a 5% carob bean flour ether thickening
300 parts of a 10% starch ether thickening
80 parts of a 20% aqueous paste of the dye C.I. Vat Blue 4 (Colour Index, 2nd edition, 1956, volume 2, page 2494, C.I. No. 69,800)
320 parts of water ―――
1000 parts After printing and drying, a portion of the material is impregnated with the following solution by means of a two-roll padding machine:

(α)

50 parts of the compound having the formula:

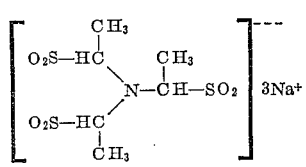

90 parts of an aqueous sodium hydroxide solution of 38° Baumé strength
15 parts of sodium tetraborate and
845 parts of water ―――
1000 parts Without intermediate drying, the cloth is then steamed for thirty seconds at 115° C. in air-free steam and finished off in the usual way. A blue print on a white ground is obtained.

Another portion of the printed and dried cloth is impregnated by means of a two-roll padding machine with the following solution containing a new reducing mixture:

(β)

35 parts of the compound having the Formula IV
0.2 part of the compound having the Formula V

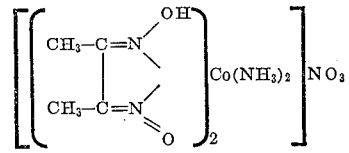

90 parts of an aqueous sodium hydroxide solution of 38° Baumé strength
15 parts of sodium tetraborate and
859.8 parts of water ―――
1000 parts Without intermediate drying, the cloth impregnated with this solution merely requires to be steamed for twenty seconds at 115° C. in air-free steam to give a bright blue print on a white ground.

The comparison shows that when using the new reducing mixture solution (β) 30% less of the compound having the Formula IV is necessary than when using the solution (α) and that when using solution (β) the steaming period required is only two thirds of that necessary when using the solution (α).

It is also possible to add 0.5 part of the compound having the Formula V to the printing composition. In that case it is unnecessary to add the compound V to the solution (β). The effect achieved is the same however.

*Example 2*

Example 1 is repeated but using 0.2 part of the following compound instead of the compound having the Formula V in the solution (β):

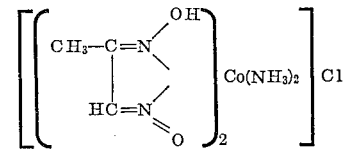

The same result is obtained in this way.

*Example 3*

Example 1 is repeated but using 0.2 part of the following compound instead of the compound having the Formula V in solution (β):

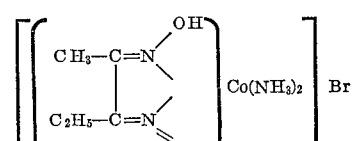

*Example 4*

Example 1 is repeated but using 0.2 part of the following compound instead of the compound having the Formula V in the solution (β):

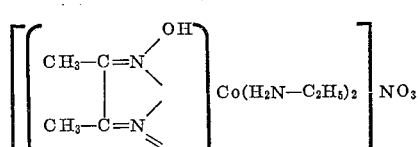

Example 5

Example 1 is repeated but instead of using the compound having the Formula V in the solution (β), a compound having the following formula is used:

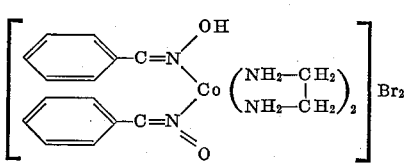

Example 6

Example 1 is repeated but instead of using the compound having the Formula V in solution (β), 0.4 part of the compound having the following formula is used:

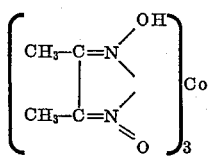

Example 7

Cotton cloth is printed with the following print paste:

(α)

20 parts of the dye C.I. Vat Red 10 (Colour Index, 2nd edition, 1956, volume 2, page 2460, C.I. No. 67,000)
60 parts of thiodiglycol
600 parts of starch-tragacanth thickening
120 parts of potassium carbonate
80 parts of the compound having the formula:

$$(H_2N-CH_2-SO_2)^-Na^+ \quad (VI)$$

120 parts of water
―――
1000 parts

After the cloth has been printed and dried, it is steamed in a star steamer for fifteen minutes in air-free steam at 100° C. and the red print finished off in the usual way by rinsing and oxidation.

If the following print paste (β) containing a reducing mixture according to this invention be used instead of the print paste (α):

(β)

20 parts of the dye C.I. Vat Red 10
60 parts of thiodiglycol
600 part of starch-tragacanth thickening
120 parts of potassium carbonate
80 parts of the compound having the Formula VI
0.05 part of the compound having the formula:

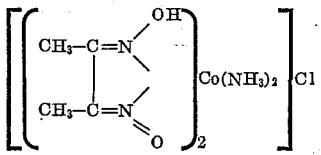

119.95 parts of water
―――
1000 parts and otherwise the above procedure is followed, a steaming period of only eight minutes is required for fixation of the dye instead of fifteen minutes.

Example 8

Raincoat poplin cloth which has been previously cleaned is padded with a 0.5% cobalt dimethylglyoxime solution and intermediately dried. This cloth is then impregnated on a two-roll padding machine (squeezing effect 80%) with the following solution:

35 parts of the dye C.I. Vat Brown 44 (Colour Index, 2nd edition, 1956, volume 2, page 2548, C.I. No. 70,802)
100 parts of aqueous sodium hydroxide solution of 38° Baumé
60 parts of the sodium salt of 1-hydroxyethanesulfinic acid-(1)
30 parts of sodium sulfate and
775 parts of water
―――
1000 parts The cloth is then passed through a continuous steamer in which the brown dye is fixed by steaming at 115° C. of thirty seconds duration. The dyed cloth is then finished off in the usual way.

If the pretreatment with a 0.5% cobalt dimethylglyoxime solution is omitted, a steaming period of at least forty-five seconds is required and moreover a far less level dyeing is obtained.

Example 9

A cloth of secondary acetate rayon fibers is dyed with 3% of the azo dye obtainable by coupling diazotized 1-amino-4-nitrobenzene with 1-dihydroxyethylamino-3-methylbenzene and then printed with the following print paste:

(α)

30 parts of Bz-1-methoxybenzanthrone
30 parts of sodium benzylsulfanilate
100 parts of the calcium salt of hydroxymethanesulfinic acid
60 parts of polyethylene glycol
50 parts of triethanolamine
500 parts of crystal gum thickening 1:2 and
230 parts of water
―――
1000 parts After the cloth has been printed and dried, it is steamed for ten minutes and finished off as usual. A green discharge print is obtained on a red ground.

By using, instead of the print paste (α), the following print paste containing a new reducing mixture:

(β)

30 parts of Bz-1-methoxybenzanthrone
30 parts of sodium benzylsulfanilate
100 parts of the calcium salt of hydroxymethanesulfinic acid
0.1 part of the compound having the formula:

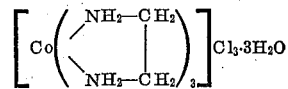

60 parts of polyethylene glycol
50 parts of triethanolamine
500 parts of crystal gum thickening 1:2 and
229.9 parts of water
―――
1000 parts and proceeding otherwise as explained above, a steaming period of only five minutes is necessary.

Example 10

The procedure of Example 9 is followed but instead of the cobalt chelate complex in the print paste (β), 0.1 part of the compound having the formula:

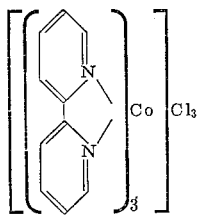

is used. Again a steaming period of only five minutes is required.

Example 11

The procedure of Example 9 is followed but instead of the cobalt chelate complex in the print paste (β), 0.1 part of the compound having the formula:

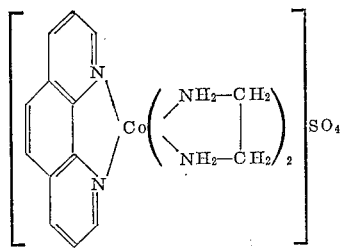

is used. Again a steaming period of only five minutes is required.

Example 12

The procedure of Example 9 is followed but instead of the cobalt chelate complex used in the print paste (β), 0.2 part of the compound having the formula:

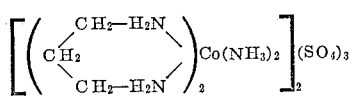

is used. A steaming period of about five minutes is required.

Example 13

The procedure of Example 9 is followed but instead of the cobalt chelate complex used in the print paste (β), 0.2 part of the compound having the formula:

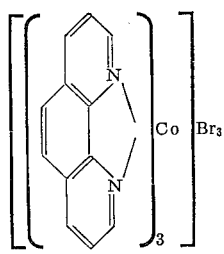

is used. A steaming period of about five minutes is required.

Example 14

Cotton cloth is printed with the following print paste:

(α)

150 parts of 4,4'-dimethyl - 5,6,7' - trichlorothioindigo (20%)
600 parts of a 5% carob bean flour ether thickening and
250 parts of water 1000 parts After the cloth has been printed and dried, it is impregnated with the following solution on a two-roll padding machine:

(γ)

80 parts of the sodium salt of hydroxymethanesulfinic acid
80 parts of aqueous sodium hydroxide solution 38° Baumé
15 parts of sodium tetraborate and
825 parts of water 1000 parts The cloth is then steamed for four minutes at 115° C. A blue print on a white ground is obtained.

By using, instead of the solution (γ), the following solution (δ) containing a reducing mixture according to the invention:

(δ)

80 parts of the sodium salt of hydroxymethanesulfinic acid
0.1 part of the compound having the formula:

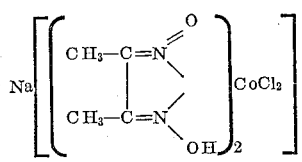

(VII)

80 parts of aqueous sodium hydroxide solution 38° Baumé
15 parts of sodium tetraborate and
824.9 parts of water 1000 parts or by using, instead of the print paste (α), the following print paste:

(β)

150 parts of 4,4'-dimethyl-5,6,7'-trichlorothioindigo (20%)
600 parts of a 5% carob bean flour ether thickening
0.1 part of the compound of the Formula VII and
249.9 parts of water 1000 parts and following the same procedure, only one minute is required for steaming instead of four minutes.

Example 15

The directions of Example 14 are followed but the compound having the Formula VII is replaced by 0.2 part of the compound having the formula:

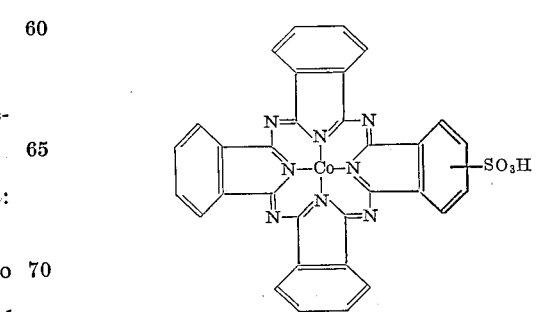

Shortening of the steaming period from four minutes to one minute is again achieved.

Example 16

The directions of Example 14 are followed but the compound having the Formula VII is replaced by 0.2 part of the compound having the formula:

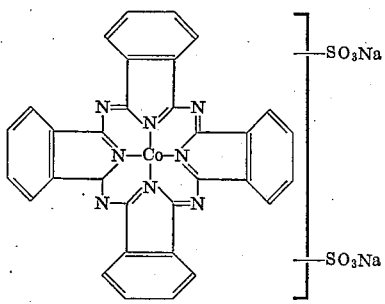

Shortening of the steaming period from four minutes to one minute is achieved.

Example 17

The directions of Example 14 are followed but the compound having the Formula VII is replaced by 0.3 part of the compound having the formula:

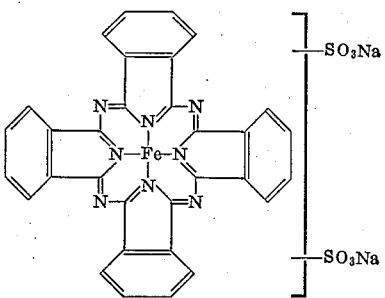

Shortening of the steaming period from four minutes to one minute is achieved.

Example 18

The directions of Example 14 are followed but the compound having the Formula VII is replaced by 0.3 part of the compound having the formula:

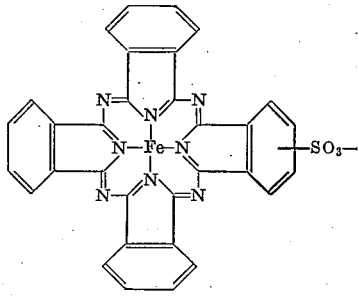

Shortening of the steaming period from four minutes to one minute is achieved.

Example 19

The directions of Example 14 are followed but the compound having the Formula VII is replaced by 0.3 part of hemin having the formula:

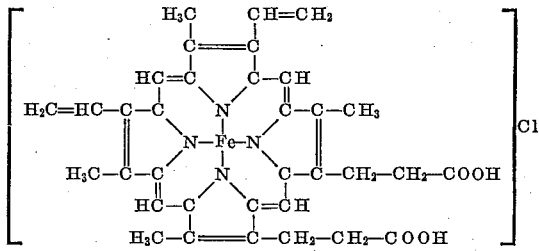

Shortening of the steaming period from four minutes to one minute is achieved.

Example 20

The directions of Example 14 are followed but the compound having the Formula VII is replaced by 0.3 part of the cobalt chelate complex with diphenylthiocarbazone (prepared by reaction of an aqueous solution of cobalt nitrate $(Co(NO_3)_2)$ with a solution of diphenylthiocarbazone in carbon tetrachloride).

Shortening of the steaming time from four minutes to one minute is achieved.

Example 21

The directions of Example 14 are followed but the compound having the Formula VII is replaced by 0.3 part of the compound having the formula:

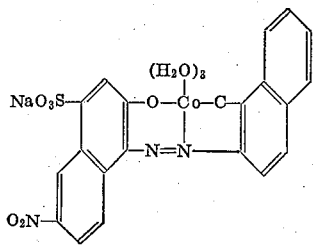

Shortening of the steaming period from four minutes to one minute is achieved.

Example 22

Spun rayon fabric is dyed with 2% of the red direct dye C.I. Direct Red 79 (Colour Index, 2nd edition, 1956, volume 2, page 2103, C.I. No. 29,065) and printed with the following print paste:

(α)

300 parts of a 5% carob bean flour ether thickening
300 parts of a 10% starch ether
20 parts of the dye C.I. Vat Green 1 (Colour Index, 2nd edition, 1956, volume 2, page 2519, C.I. No. 59,825)
80 parts of formamidinesulfinic acid and
300 parts of water 1000 parts.

After the cloth has been printed and dried, it is impregnated with the following solution by means of a two-roll padding machine.

(γ)

100 parts of sodium carbonate
15 parts of sodium tetraborate and
885 parts of water 1000 parts Without intermediate drying, the cloth is then steamed for one minute at 110° C. A green print on a red ground is obtained.

By using, instead of the print paste (α), the following print paste containing a new reducing mixture:

(β)

300 parts of a 5% carob bean flour ether thickening
300 parts of a 10% starch ether
20 parts of the dye C.I. Vat Green 1
0.5 part of the compound having the formula:

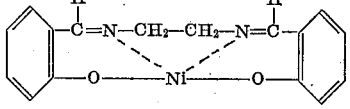

(VIII)

80 parts of formamidinesulfinic acid and
299.5 parts of water 1000 parts or by using, instead of the solution (γ), the following solution:

(δ)

100 parts of sodium carbonate
15 parts of sodium tetraborate
0.5 part of the compound having the Formula VIII and
884.5 parts of water
―――
1000 parts and otherwise following the above procedure, a steaming period of only thirty seconds is required instead of one minute.

*Example 23*

The directions of Example 22 are followed but 0.7 part of the chelate complex bis-(methylglyoximato)-nickel is used instead of the compound having the Formula VIII. The steaming period is again 30 seconds.

*Example 24*

The directions of Example 22 are followed but 0.7 part of the chelate complex bis-(methylethylglyoximato)-nickel is used instead of the compound having the Formula VIII. The steaming period is again thirty seconds.

*Example 25*

The directions of Example 22 are followed but 0.8 part of bis-(benzildroximato)-nickel is used instead of the compound having the Formula VIII. The steaming period is again thirty seconds.

*Example 26*

The directions of Example 22 are followed but 0.8 part of the nickel chelate complex of dicyanodiamidine is used instead of the compound having the Formula VIII. The steaming period is again thirty seconds.

*Example 27*

The directions of Example 22 are followed but 0.8 part of the nickel chelate complex of dithiooxamide is used instead of the compound having the Formula VIII. The steaming period is again thirty seconds.

*Example 28*

The following mixtures may be used instead of the reducing mixture described in Example 9:

(A)

99.5% of the calcium salt of hydroxymethanesulfinic acid
0.5% of the compound having the Formula VIII (B)

99.6% of the compound having the formula

[H₂N—CH₂—SO₂]₂⁻⁻Ba⁺⁺

0.4% of the compound having the formula

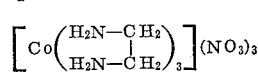

and the following mixture may be used instead of the reducing mixture according to this invention described in Example 22:

(C)

99.8% of formamidinesulfinic acid
0.2% of the compound having the Formula VII

The following new mixtures may be used for example instead of the reducing mixtures described in Examples 1, 7, 8 and 14:

(D)

99.6% of the compound having the formula

HO—CH₂—SO₂Na 0.4% of the compound having the formula:

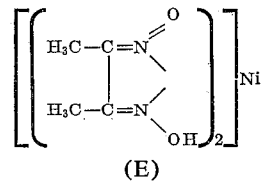

(E)

99.9% of the compound having the formula

OH
|
H₃C—CH—SO₂Na 0.1% of the compound having the Formula V (Example 1)

(F)

99.6% of the compound having the formula:

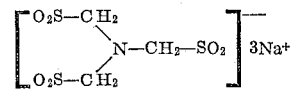

0.4% of the compound having the formula:

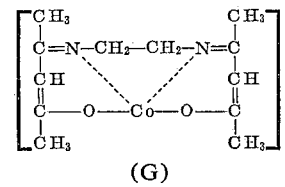

(G)

99.8% of the compound having the formula:

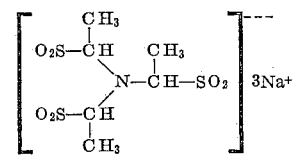

0.2% of the compound having the Formula VIII (Example 22)

(H)

99.6% of the compound having the formula:

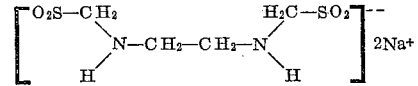

0.4% of the compound having the Formula V (Example 1)

(J)

99.95% of the compound having the formula

H₃C—CH₂—CH—SO₂—K
|
OH 0.5% of the compound having the Formula VIII (Example 22)

(K)

99.95% of the compound having the formula:

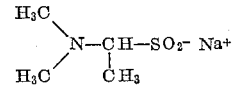

0.05% of the compound having the Formula V (Example 1)

(L)

99.7% of the compound having the formula:

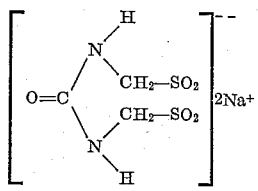

0.3% of the compound having the Formula VII (Example 14)

(M)

99.98% of the compound having the formula:

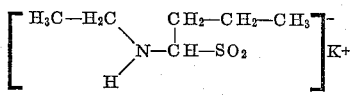

0.02% of the compound having the Formula V (Example 1)

We claim:

A composite reducing agent for use in the textile industry consisting essentially of:

(a) a reducing agent having the general formula:

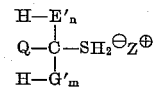

in which Q is selected from the group consisting of hydroxyl and a group having the formula:

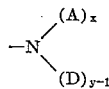

wherein A is selected from the group consisting of hydrogen, alkyl having one to four carbon atoms and alkyl having one to four carbon atoms and which is substituted by the group

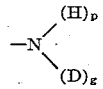

wherein D in the above formulae is a group having the formula:

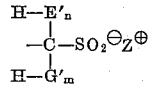

$x$ is one of the numbers 0, 1 and 2;
$y$ is one of the numbers 1, 2 and 3;
$(x+y)$ is the number 3;
$p$ is one of the numbers 0, 1 and 2;
$g$ is one of the numbers 0, 1 and 2;
$(p+g)$ is the number 2;
$E'$ is an alkylene group;
$G'$ is an alkylene group;
$E'$ and $G'$ together contain a maximum of three carbon atoms;
$n$ is one of the numbers 0 and 1;
$m$ is one of the numbers 0 and 1; and
$Z^{\oplus}$ is the cationic equivalent constituted by one of the bases ammonium, sodium, potassium, magnesium, calcium and barium;
and (b) as a redox catalyst, a chelate complex of one of the metals having the atomic numbers 26, 27 and 28 with a chelating agent selected from the group consisting of ($\alpha$) agents having the formula:

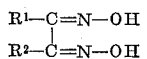

in which $R^1$ is selected from the group consisting of hydrogen, alkyl having up to two carbon atoms and phenyl and $R^2$ is selected from the group consisting of alkyl with up to two carbon atoms and phenyl, ($\beta$) agents having the formula:

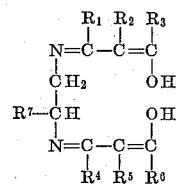

in which $R^1$ and $R^4$ are selected from the group consisting of hydrogen atoms and methyl; the molecular portions:

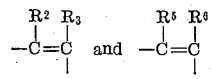

are selected from the group consisting of

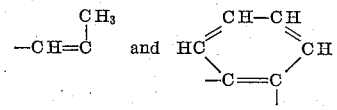

and $R^7$ is selected from the group consisting of hydrogen atoms and methyl, and ($\gamma$) agents having the formula:

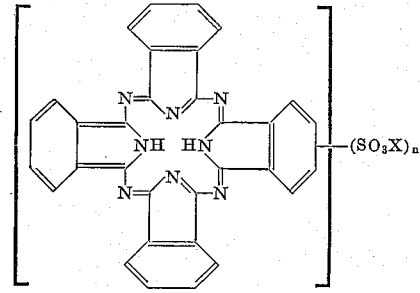

in which X is selected from the group consisting of hydrogen, sodium and potassium, and $n$ is one of the numbers 0, 1, 2, 3 and 4, the content of (b) in said agent being 0.005 to 5% by weight with reference to (a).

References Cited by the Examiner

UNITED STATES PATENTS

| 2,164,930 | 7/1939 | Lubs | 8—34 |
| 2,407,346 | 9/1946 | Rogers | 8—1.3 XR |
| 2,662,896 | 12/1953 | Pederson | 8—1.3 XR |
| 2,761,868 | 9/1956 | Lacey | 8—1.3 XR |
| 2,772,284 | 11/1957 | Barnhart et al. | 8—1.3 XR |
| 2,914,537 | 11/1959 | Randell et al. | 8—1.3 XR |
| 2,993,742 | 7/1961 | Conrad et al. | 8—70 |
| 2,993,743 | 7/1961 | Conrad et al. | 8—70 |

FOREIGN PATENTS

| 777,377 | 6/1957 | Great Britain. |
| 863,915 | 3/1961 | Great Britain. |

JULIUS GREENWALD, Primary Examiner.